United States Patent [19]

O'Hara

[11] 4,448,170

[45] May 15, 1984

[54] WATER INJECTION SYSTEM FOR INTERNAL COMBUSTION ENGINE

[76] Inventor: Arthur C. O'Hara, 4978 Skyline Dr., Syracuse, N.Y. 13215

[21] Appl. No.: 388,359

[22] Filed: Jun. 14, 1982

[51] Int. Cl.³ .......................................... F02M 25/02
[52] U.S. Cl. .............................. 123/25 A; 123/25 E; 123/25 B; 123/25 L
[58] Field of Search .................. 123/25 B, 25 E, 25 R, 123/25 A, 25 L, 25 P, 198 A; 261/18 A

[56] References Cited

U.S. PATENT DOCUMENTS

| | | | |
|---|---|---|---|
| 2,445,479 | 7/1948 | Francis | 123/25 B |
| 2,493,808 | 1/1950 | Garrigus | 123/25 L |
| 2,507,596 | 5/1950 | Hodgkins | 123/25 R |
| 2,576,450 | 11/1951 | De Marval | 123/25 B |
| 3,987,774 | 10/1976 | Waag | 123/25 J |
| 4,078,527 | 3/1978 | Yasuda | 123/25 L |

*Primary Examiner*—Ira S. Lazarus
*Attorney, Agent, or Firm*—Charles S. McGuire

[57] ABSTRACT

A system for injecting controlled amounts of water into the fuel intake to the cylinders in proportional response to the pressure in the engine's exhaust manifold. First conduit means, preferably including an extended surface heat sink and a length of flexible, plastic tubing, communicate the exhaust manifold pressure to the upper surface of a supply of water in an enclosed container. A lower part of the container is connected by second conduit means to a point in the fuel intake system, preferably in the air inlet to the carburetor. An adjustable throttling valve is interposed in the second conduit means for selective control of the relation of water flow to exhaust manifold pressure.

2 Claims, 1 Drawing Figure

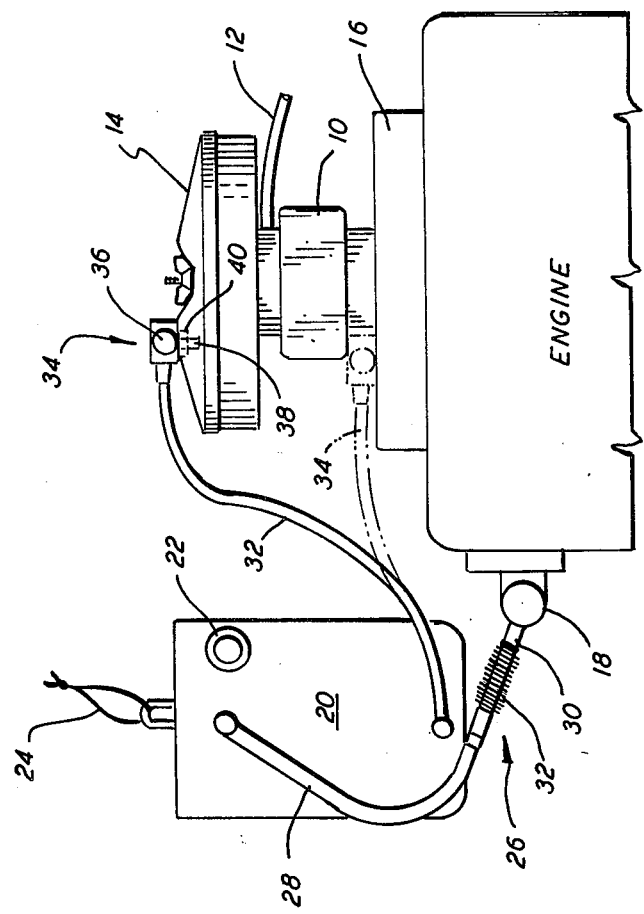

WATER INJECTION SYSTEM FOR INTERNAL COMBUSTION ENGINE

BACKGROUND OF THE INVENTION

The present invention relates to water injection systems for adding controlled amounts of water to the fuel supply of an internal combustion engine, and more specifically to a water injection system wherein the supply or flow rate is controlled as a function of exhaust manifold pressure.

The benefits of injecting controlled amounts of water into the cylinders of an internal combustion engine together with the fuel have long been recognized. Tractors, racing cars and aircraft, as well as passenger automobiles, have employed various systems for injecting water into the fuel intake primarily as a means of increasing the power output of the engine. Water injection may also have other benefits, such as increasing gas mileage, reducing knocking or pinging due to pre-ignition, reducing engine operating temperature, and promoting cleaner fuel burning to lessen deposits of carbon and other foreign matter in the engine and exhaust system.

Prior art systems for injecting water into the engine fuel intake include complex and expensive as well as relatively simple systems. For example, some water injection systems utilize tachometer inputs, water pumps, electrical controls, and the like for metering the flow of water into the fuel intake system. Others rely upon variations in the sub-atmospheric pressure (or vacuum) within the fuel intake manifold to pull in the water from a supply container. Although the latter are more economical, they do not always provide the optimum amount of water required by the engine for added power and knock suppressant.

It is a principal object of the present invention to provide a system for injecting a controlled amount of water into the fuel intake of an internal combustion engine which is simple and economical in construction and operation, yet automatically controls the flow of water in an optimum manner.

Another object is to provide a water injection system of novel and improved construction wherein the amount of water added to the fuel intake of an internal combustion engine is automatically regulated in accordance with the requirements for added engine power and knock suppressant under any given driving conditions.

A further object is to provide a water injection system which is easy to install on the internal combustion engines of existing vehicles for improvement of a number of operating characteristics thereof in an optimum manner consistent with the requirement therefore.

Other objects will in part be obvious and will in part appear hereinafter.

SUMMARY OF THE INVENTION

In accordance with the foregoing objects the invention contemplates a system for injecting water from a supply container into the fuel intake of an internal combustion engine as a function of the exhaust manifold pressure of the engine. A supply of water is carried in an enclosed supply container, preferably in the form of a flexible, plastic bag supported at a convenient position within the engine compartment. Exhaust manifold pressure is communicated to the water container via first conduit means, including a tubular, extended surface, metal heat exchanger threadedly connected at one end to the exhaust manifold and at the other to a length of flexible, plastic tubing.

The tubing of the first conduit means is connected to an upper portion of the water supply container to apply exhaust manifold pressure to the upper surface of the water therein. Second conduit means connects a lower portion of the water container to a point in the engine fuel intake system, preferably at the air intake above the carburetor. The second conduit means includes a second length of plastic tubing and a throttling valve, selectively adjustable to control the rate of flow therethrough in response to a given pressure. The valve may be conveniently installed in an opening provided for such purpose in the cover of the air intake and filter housing normally positioned on top of the carburetor in most present-day motor vehicles. The first conduit means tubing is of larger inside diameter, preferably between about 1½ and 2 times, the inside diameter of the second conduit means tubing to provide faster response in the flow of water to changes in exhaust manifold pressure.

BRIEF DESCRIPTION OF THE DRAWING

The single FIGURE is an elevational view of the water injection system of the invention installed on a typical motor vehicle internal combustion engine, portions of which are illustrated somewhat diagrammatically.

DETAILED DESCRIPTION

Referring now to the drawing, an entirely conventional internal combustion engine includes carburetor 10, with fuel intake line 12 and air intake and filter housing 14, intake manifold 16 and exhaust manifold 18. Operation of such engines in the usual manner is well understood and requires no elaboration. As is also well known, engine operation may be improved in a number of respects, such as those mentioned earlier herein, by injection of water into the fuel intake entering the cylinders for combustion. Although the presence of water in the fuel tank or fuel intake line 12 will cause the engine to operate roughly, or not at all, the addition of controlled amounts of water for vaporization with the air-fuel mixture, particularly when the engine is operating under heavy loads, is beneficial.

The water injection system of the present invention includes an enclosed, substantially air-tight container 20 which, in the preferred form, is a collapsible bag of flexible material such as plastic, sealed about its peripheral edges. An opening, having removable cap 22, is provided in an upper portion of container 20 for filling the latter with a supply of water up to the level of the opening. Container 20 is suspended by flexible strap 24 at any convenient location adjacent the engine wherein the water injection system is employed. Flexibility of the container walls permits considerable latitude in the positioning thereof in confined spaces, and is therefore preferred, but operation of the system would be the same with a rigid container.

The pressure in exhaust manifold 18 is utilized to control the flow of water into the fuel intake in the injection system of the present invention. For this purpose, the interior of the exhaust manifold communicates with an upper portion of container 20, above the level of the water therein, by first conduit means denoted generally by reference numeral 26. Since some movement of the conduit means may be expected due to temperature changes, vibrations or movements of the associated engine, etc., it is preferred that at least a portion of the conduit means 26 be of highly flexible tubing, such as any of a number of readily available plastic materials. Also, since such materials, as well as that of container 20, are likely to have relatively low melting points and the temperature of the exhaust gases in manifold 18 are very high, heat sink means are provided between the exhaust manifold and plastic tubing. Accordingly, first conduit means 26 includes flexible, plastic tubing 28 and a heat sink comprising steel tube 30 and extended surface heat exchanger 32, such as a metal tube with a spiral fin attached to the outer surface thereof.

Tube 30 is threaded into a hole drilled and tapped for such purpose in exhaust manifold 18 and is connected by a suitable fitting or adapter to heat exchanger 32. Flexible tubing 28 is connected at one end to heat exchanger 32 and at the other to container 20 above the surface of the water therein. Thus, the pressure in exhaust manifold 18 is communicated to the interior of enclosed container 20 after the temperature of the exhaust gases has been suitably reduced by the heat sink means.

A second conduit means, preferably a second length of flexible plastic tubing 32, connects a lower portion of container 20 with control valve 34, a conventional throttling valve having manually adjustable knob 36 on one side for selective adjustment of the size of the flow opening in the valve. Water flows from container 20, through tubing 32, and valve 34, into the fuel intake of the engine. For this purpose, valve 34 may be mounted upon intake manifold 16 (as shown in dot-dash lines), between carburetor 10 and manifold 16, between air intake housing 14 and carburetor 10, or directly upon air intake housing 14, as shown in solid lines. This is the normally preferred mounting arrangement since the air intake housing of most vehicle engines is readily accessible and has an easily moveable cover. Valve 34 may be mounted upon air intake housing 14 by drilling a hole of appropriate size, inserting therethrough threaded outlet tube 38 of valve 34 and securing the valve to the housing cover by nut 40.

From the foregoing, it may be seen that the present invention provides a water injection system which is simple and economical in construction and operation, yet very efficient in automatically establishing a rate of water flow into the fuel intake of an internal combustion engine which is proportional to engine load. Conventional systems which supply water in response to the sub-atmospheric pressure or vacuum in the engine intake manifold consume water at a rather fast rate which is highest when the requirement for water as an antiknock or power enhancing agent is least. That is, when an engine is operating at normal load, the intake vacuum will be pulling water into the fuel intake even though there is no substantial need for knock suppression or added power. On the other hand, when the engine is operating under heavier loads, as when the vehicle is moving up steep grades in higher gears, the intake vacuum is smaller thus drawing in less water in a vacuum-operated system; however, the exhaust manifold pressure is greater under such conditions, whereby the injection system of the present invention forces more water into the fuel intake, providing more power and effectively reducing or eliminating knocking when the requirement is greatest.

Another feature which further enhances operation of the system is making the first conduit means of larger cross-sectional area than the second conduit means. This provides a faster response in the change in water flow rate to changes in exhaust manifold pressure. For example, $\frac{3}{8}''$ O.D. plastic tubing with 0.050'' wall thickness as the first tubing, and $\frac{1}{4}''$ O.D., 0.040'' wall thickness as the second, providing an inside diameter of the first tubing approximately 1.62 times that of the second tubing has provided good results. For operation with most conventional vehicle engines, it is preferred that the first conduit means have an inside diameter, communicating the engine exhaust manifold pressure to the air space at the top of the water container, be between about $1\frac{1}{2}$ and 2 times the inside diameter of the second conduit means, carrying the water from the container to the control valve.

Adjustment of the control valve to provide the best operation may be performed on a trial-and-error basis, or settings of a particular valve may be prescribed for use with specified engines. The setpoint limits will be indicated by engine knocking when the valve is closed too far, and missing under heavy acceleration when opened too far. It is recommended that when the water injection system is installed, ignition timing be advanced by 4 to 10 degrees from that specified for normal operation. Thus, the flow rate of water into the fuel intake system is governed jointly by exhaust manifold pressure and the degree of opening of the control valve. It may also be influenced by intake manifold vacuum, if desired, by mounting the valve for discharge into the intake manifold. Although the foregoing description has referred only to water as an additive to the fuel intake, it will be understood that other liquids may be added to reduce the freezing temperature as required in cold-weather operation.

What is claimed is:

1. A water injection system for installation on a conventional internal combustion engine of a motor vehicle to automatically add controlled amounts of water to the engine fuel intake as a function of pressure in the engine's exhaust manifold, said system comprising, in combination:

(a) an enclosed, flexible-walled, plastic container supported adjacent the engine and holding a quantity of water;

(b) a length of hollow, metal tubing surrounded by an extended surface heat exchanger and having one end communicating with the interior of said exhaust manifold;

(c) a first length of hollow, flexible, plastic tubing having a first internal diameter and connected at one end to the other end of said metal tubing and at the other end to an upper portion of said container, whereby the pressure in said exhaust manifold is communicated to said container upper portion after the temperature of the exhaust gases has been suitably reduced by said metal tubing and heat exchanger;

(d) a second length of hollow, flexible, plastic tubing having a second internal diameter less than said first diameter and connected at one end to a lower portion of said container; and (e) a manually adjustable throttling valve mounted upon the top of the air intake housing for the engine's carburetor, and having an inlet connected directly to the other end of said second plastic tubing and an outlet discharging directly into the carburetor air intake, whereby water flows through said second tubing and valve into the carburetor for mixture with the normal fuel intake system as governed jointly by the exhaust manifold pressure and the degree of opening of said throttling valve.

2. The invention according to claim 1 wherein said first tubing diameter is from about 1½ to about 2 times the diameter of said second tubing.

* * * * *